UNITED STATES PATENT OFFICE.

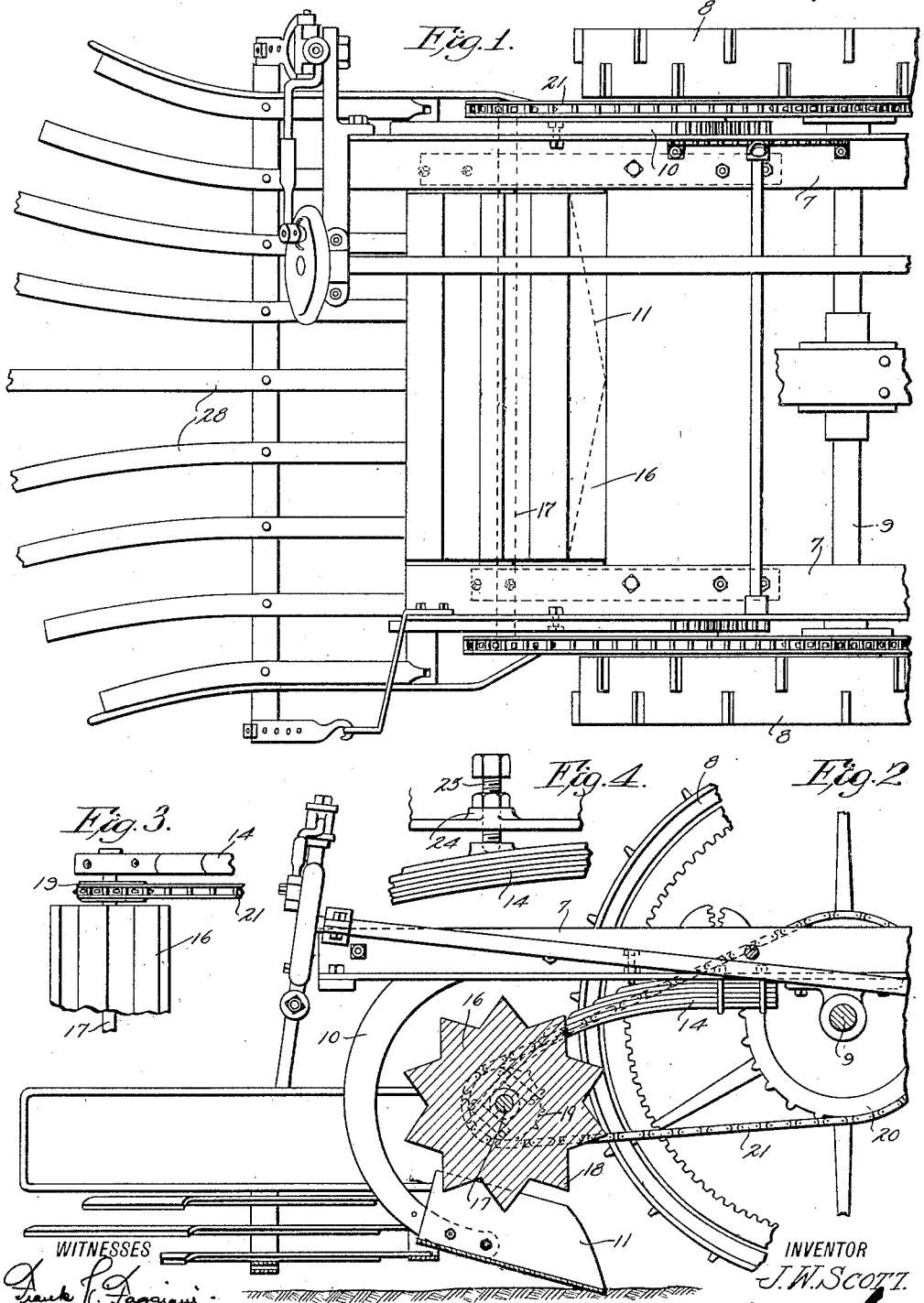

JAMES WADDLE SCOTT, OF FALCON, COLORADO.

AGRICULTURAL IMPLEMENT.

1,345,964. Specification of Letters Patent. Patented July 6, 1920.

Application filed January 16, 1920. Serial No. 351,749.

*To all whom it may concern:*

Be it known that I, JAMES WADDLE SCOTT, a citizen of the United States, and a resident of the city of Falcon, in the county of El Paso and State of Colorado, have invented a new and useful Agricultural Implement, of which the following is a full, clear, and exact description.

This invention relates to agricultural implements, and more particularly to clod breakers for use in connection with potato diggers and plows. The invention also has particular relation to a clod roll or clod-breaking mechanism to be used in connection with the potato digging machine as secured by me in a Patent No. 396,433, issued January 22, 1889, an application for improvements on which was filed the 3rd day of January, 1920, Ser. No. 349,176.

An object of the invention is to provide a clod-breaking machine having a positive crushing, rolling and breaking mechanism resiliently carried on the implement and being power-driven to effectually crush and pulverize earth being plowed up by the implement.

It is also an object of this invention to provide adjustable means for varying the resilient tension of the clod-supporting means in order that the device may be adjusted to meet the varying agricultural conditions where the ground may be comparatively soft and easy to break and pulverize in one instance, while on the other hand the ground being plowed may possibly be very dry and hard, rendering it necessary to adjust the resilient tension impressed on the clod-breaking mechanism.

With the above and other objects in view the invention has relation to the combination and arrangement of simplified parts as defined in the appended claims, and one practical embodiment of which is described in the following specification, and portrayed in the accompanying drawings, wherein:

Figure 1 illustrates a plan fragmentary view of the clod-breaking mechanism applied to any appropriate form of agricultural implement;

Fig. 2 illustrates a side fragmentary view of the clod roll applied to an agricultural implement, parts thereof being shown in section;

Fig. 3 illustrates a fragmentary plan view of one end of the clod-breaking roll supported by a spring, showing the journaled connection between the clod-breaking roll and spring; and, Fig. 4 illustrates a fragmentary view of an adjusting mechanism for varying the impressed tension of the supporting spring which carries the clod-breaking roll.

An agricultural implement constructed in accordance with the plans of this invention incorporates a spring supported clod-breaking roll on any appropriate form of agricultural implement, such as a plow, potato digger, or other form of farm tool. The clod-breaking roll is power-driven, and it is usually practical to accomplish this by driving the clod-breaking roll from the ground or traction wheel of the farm tool.

Other features of construction and operation appear in detail in the following specification.

In presenting a more detailed description of the invention, there is shown in the drawings the frame 7 of a plow or other farm tool. The agricultural implement is usually supplied with ground or traction wheels 8, carried on a shaft 9. In this instance the invention is described in connection with a plow having a potato digging attachment, and to this end there is shown the plow beam 10 with a plow blade 11.

A pair of springs 14 have one end anchored to the frame 7, which projects the free end of this frame rearwardly and downwardly from the frame to carry a clod-breaking roll. It is practical to employ a semi-elliptical leaf spring for use in a machine of this character, since the spring has inherent transverse rigidity, yet the outer lower free end has the facility of vertical resiliency, which makes for the effectiveness in the operation of the clod-breaking roll. The spring shown in the drawings embodies a multi-leaf elliptic spring mounted on the underneath side of frame 7 with suitable bolts or yokes usually employed in securing this type of spring to a vehicle.

The detailed fragmentary view of Fig. 3 exhibits the manner of supporting the clod-breaking roll on the outer lower free end of the leaf spring 14. It is usually the practice to fix a journal box or other suitable bearing on the outer end of the spring 14 to pivotally carry the roll. The clod-breaking roll 16 is shown disposed in horizontal position between the two springs 14, and carried on a shaft 17. The periphery of the clod-breaking roll is notched or serrated to provide breaking and cutting ridges 18 running parallel with the axis of the roll. The shaft 17 is supported in journal boxes anchored to the end of each spring. A sprocket 19 is secured to the shaft 17 to drive the roll 16. Likewise a sprocket 20 is fixed to the traction wheel 8 or the shaft 9, and a drive chain 21, and the chain 21 is carried on the two sprockets to drive the clod roll 16 from the traction wheel 8. An adjusting means is provided for the purpose of varying the tension impressed on the spring 14 in order to increase or decrease the resistance of the spring. This means may comprise a pressure cap screw or bolt 23 screwed into a threaded hole in a boss 24 made on the frame 7. The lower end of the screw 23 is finished off in the form of a spherical head seating in a socket made on the upper face of the spring 14. By turning the screw up or down the stiffness of the spring is decreased and increased, as the screw 23 in fact, acts as a limiting point to shorten or increase the bending moments of the spring when it undergoes flexing movements in a vertical plane.

When the clod-breaking roll is used on exceedingly hard or dry ground, it is usually necessary to adjust the spring 14 by turning the screw 23 downwardly to impart a more rigid resilient facility to the spring than is necessarily employed when the tool is operating in comparatively soft ground.

It is seen how the drive chain 21 impresses a rotary motion to the roll 16 as the machine moves along the roll. This speedily brings the breaking and cutting ridges 18 into contact with the earth plowed up by the plow 11; and furthermore, the rotary action of the clod-breaking roll 16 acts to throw the dirt rearwardly from the plow, thus facilitating removal of the earth from the plow.

In the present application, I have chosen to exhibit my invention in connection with a potato digging machine. A potato digging machine is more particularly described in a specification constituting an application separate from the present one.

However, reference is made to a potato carrier 28 mounted on the rear of the machine to receive potatoes unearthed by the plow 11. The carrier 28 is usually subjected to a lateral vibratory action to shake the dirt from the potatoes, and to finally drop the potatoes off to the rear of the machine, leaving them on top of the ground.

It is practical to use a clod-breaking roll, such as is presented in this specification, in connection with a potato digging machine for the reason that the breaking mechanism pulverizes and reduces the large, hard clods unearthed by the plow prior to the movement of the dirt and earth rearwardly to the carrier. When the broken earth passes rearwardly to the carrier, it is less likely to cover up or damage the potatoes held by the carrier. Furthermore, the clod-breaking roll reduces the hardened clods of earth so that the carrier will not become loaded with the clods, but on the other hand the dirt will more readily pass through the slatted construction of the carrier.

It is practical, and of considerable advantage to employ this clod-breaking roll for use in connection with other forms of farm implement tools, such as plows in general. Its use will greatly increase the pulverizing of the earth and decrease the necessity for use of harrows and drags in preparing earth for seed planting.

Having thus described my invention, what I desire to secure by Letters Patent is:

1. A clod breaking device for use in combination with an implement having a plow, an earth-crushing roll attached to the implement above the plow, cutting ridges on the roll, and resilient means for attaching the roll to the farm implements.

2. A clod breaking mechanism for use in combination with a farm implement having a plow, an earth-crushing roll attached to the implement behind the plow, cutting ridges made on the roll, resilient means for attaching the roll to a farm tool, and a device for varying the resiliency of the aforesaid means.

3. A clod breaking attachment for use in connection with farm implements, comprising a serrated, and ridged earth-crushing roll, a pair of elliptic springs arranged to support the roll, and a driving mechanism to revolve the roll.

4. A clod breaking attachment for use in connection with farm implements, comprising a serrated, and ridged roll, a pair of elliptic plate springs arranged to support the roll, a driving mechanism to revolve the roll, and means for varying the tension of the springs.

5. A clod breaking attachment for use in connection with farm implements, comprising a pair of semi-elliptic springs one end of which is anchored to the aforesaid farm implement, a clod-breaking roll journaled on the other end of the springs, and an adjusting screw used to vary the tension of the springs.

6. A clod breaking attachment for use in connection with farm implements, comprising a pair of semi-elliptic springs one end of which is anchored to the aforesaid farm implement, a clod-breaking roll journaled on the other end of the springs, an adjusting screw used to vary the tension of the springs, and a driving mechanism to revolve the clod-breaking roll.

7. A combination clod breaking machine and plow, comprising a frame and ground wheels, a plow secured to the frame, a clod-breaking roll carried above the plow in spaced relation therefrom, springs rotatably supporting the roll and fixed to the frame, and means for driving the clod-breaking roll.

8. A combination clod breaking machine and plow, comprising a frame and ground wheels, a plow secured to the frame, a clod-breaking roll carried above the plow in spaced relation therefrom, springs rotatably supporting the roll and fixed to the frame, means for driving the clod-breaking roll, and means for varying the tension of the springs.

JAMES WADDLE SCOTT.